United States Patent [19]

Bolin

[11] Patent Number: 4,909,823
[45] Date of Patent: Mar. 20, 1990

[54] GLASSWARE FORMING MACHINE WITH COOLING SYSTEM

[75] Inventor: James A. Bolin, Tulsa, Okla.

[73] Assignee: Liberty Glass Company, Sapulpa, Okla.

[21] Appl. No.: 358,087

[22] Filed: May 30, 1989

[51] Int. Cl.⁴ .............................................. C03B 9/38
[52] U.S. Cl. ...................................... 65/265; 65/267; 65/319; 65/356
[58] Field of Search .................. 65/265, 267, 319, 356

[56] References Cited

U.S. PATENT DOCUMENTS

| | | | |
|---|---|---|---|
| 4,361,434 | 11/1982 | Schneider | 65/265 |
| 4,388,099 | 6/1983 | Hermening et al. | 65/356 X |
| 4,701,203 | 10/1987 | Schneider | 65/356 X |
| 4,750,929 | 6/1988 | Bolin | 65/356 X |
| 4,842,637 | 6/1989 | Bolin | 65/356 X |

Primary Examiner—Arthur Kellogg
Attorney, Agent, or Firm—Senniger, Powers, Leavitt and Roedel

[57] ABSTRACT

A cooling system for a glassware forming machine in which air is delivered to each of two plenums for upward flow of air through vertical passages in mold members on the plenums from an air outlet on the base of the machine via an air duct. The inlet end of each duct is mounted for pivoting and universal lateral sliding movement over an area in communication with the air outlet on the base, and the outlet end of the duct is mounted for pivoting movement in an opening in the respective plenum.

18 Claims, 5 Drawing Sheets

GLASSWARE FORMING MACHINE WITH COOLING SYSTEM

BACKGROUND OF THE INVENTION

This invention relates to glassware forming machines, and more particularly to a cooling system for the mold members of such a machine for forming glass bottles.

This invention is especially directed to cooling systems for the mold members of glassware forming machines of the type such as shown in U.S. Pat. Nos. 3,849,101, 4,251,253, 4,361,434, 4,388,099 and 4,561,875 wherein air is blown through passages in the mold members for cooling them, among the several objects of the invention being the provision of an improved simplified, compact system for delivering air to the mold members for upward flow of air through the air passages therein allowing for their swinging toward and away from one another between their open and closed positions, providing for relatively low restriction to flow of air and relatively uniform and efficient cooling of the mold members for production of glassware (especially bottles) at relatively high speed with relatively few defects, relatively low energy consumption in blowing air, and relatively low noise levels; and the provision of such a system wherein wear of parts is reduced for longer life of the system.

In certain respects the invention is related to the cooling system disclosed in U.S. patent application Ser. No. 081,148 of James A. Bolin filed Aug. 3, 1987 as a continuation of U.S. patent application Ser. No. 010,483 of James A. Bolin, filed as a continuation of U.S. patent application Ser. No. 859,644, filed May 5, 1986, said applications being incorporated herein by reference, Ser. No. 081,148 having issued as U.S. Pat. No. 4,750,929 on June 14, 1988. In certain respects the invention is also related to the cooling system disclosed in U.S. Application Ser. No. 157,460, this application was filed on Feb. 17, 1988, and is a continuation-in-part of application Ser. No. 67,238 filed June 25, 1987.

SUMMARY OF THE INVENTION

In general, the invention is embodied in a glassware forming machine comprising a pair of carriers each pivoted on a generally vertical fixed first axis for swinging movement toward and away from each other between an open position and a closed position, and a plurality of mold members carried by each carrie, each mold member on each carrier being related to a mold member on the other so that, with the carriers in the closed position, each mold member on one carrier mates with a mold member on the other to define a mold cavity for molding an item of glass. Each mold member has air passages extending upwardly from the bottom thereof for passage of air therethrough for cooling. Means is provided for blowing air through said air passages comprising a plenum carried by each carrier for delivering air to the air passages of the mold members carried by the carrier, the mold members extending up from the plenum and the plenum having ports at the top thereof for flow of air up into the passages in the mold members and thence up through and out of said passages, means providing a chamber below said carriers for air to be blown into the plenums and thence up through said air passages, and means for delivery of air from said chamber means to each plenum allowing swing of the carriers.

The delivery means comprises, for each carrier, means defining an air outlet at the top of the chamber for delivery of air from said chamber through said outlet. The delivery means further comprises a duct having a downwardly extending inlet at its one end and an upwardly extending outlet at its other end. The inlet and outlet are preferable laterally offset. The air delivery means further comprises means mounting the inlet end of the duct over the air outlet of the chamber for universal sliding movement of said inlet end of the duct laterally with respect to said inlet of the duct within in area in communication with the air outlet and in generally sealed relation therewith. This mounting means also permits the duct to pivot at its inlet end about a generally vertical axis in the course of its universal sliding movement. The inlet end of the duct is thus mounted over the air outlet of the chamber to slide within an area bounding the air outlet in generally sealed relation therewith, the inlet end of the duct can also pivot. The outlet end of the duct is pivotally mounted with respect to an opening in the bottom of the plenum. Thus, the inlet end of the duct slides and pivots relative to the air outlet of the chamber with the inlet of the duct in communication with the chamber for the passage of air, and the outlet end pivots relative to the manifold with the outlet of the duct in communication with the manifold for the passage of air, to accommodate the pivoting of the carriers while continuously delivering air from the chamber to the plenum.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
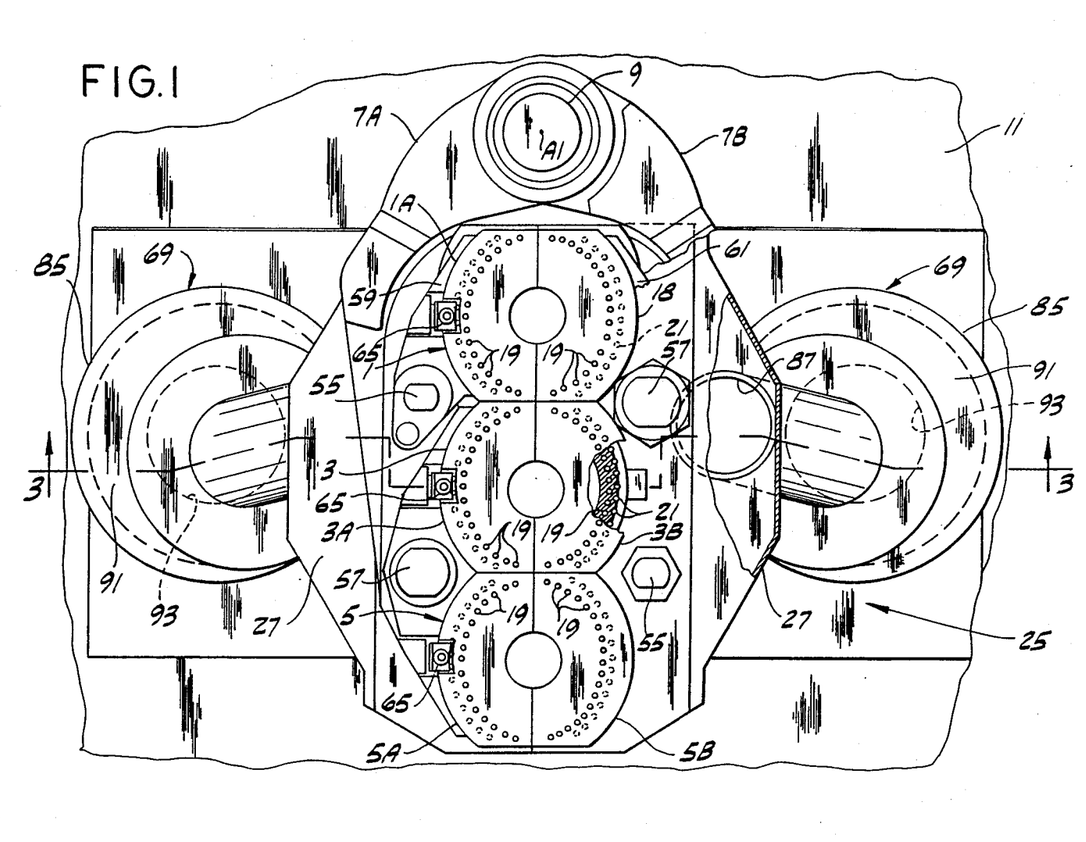
FIG. 1 is a plan, with parts broken away and shown in section, of the mold side of an individual section of a glassware forming machine in which the present invention is embodied, the mold carriers and mold members on the mold side of said section of the machine being shown in closed position.
Figure 2:
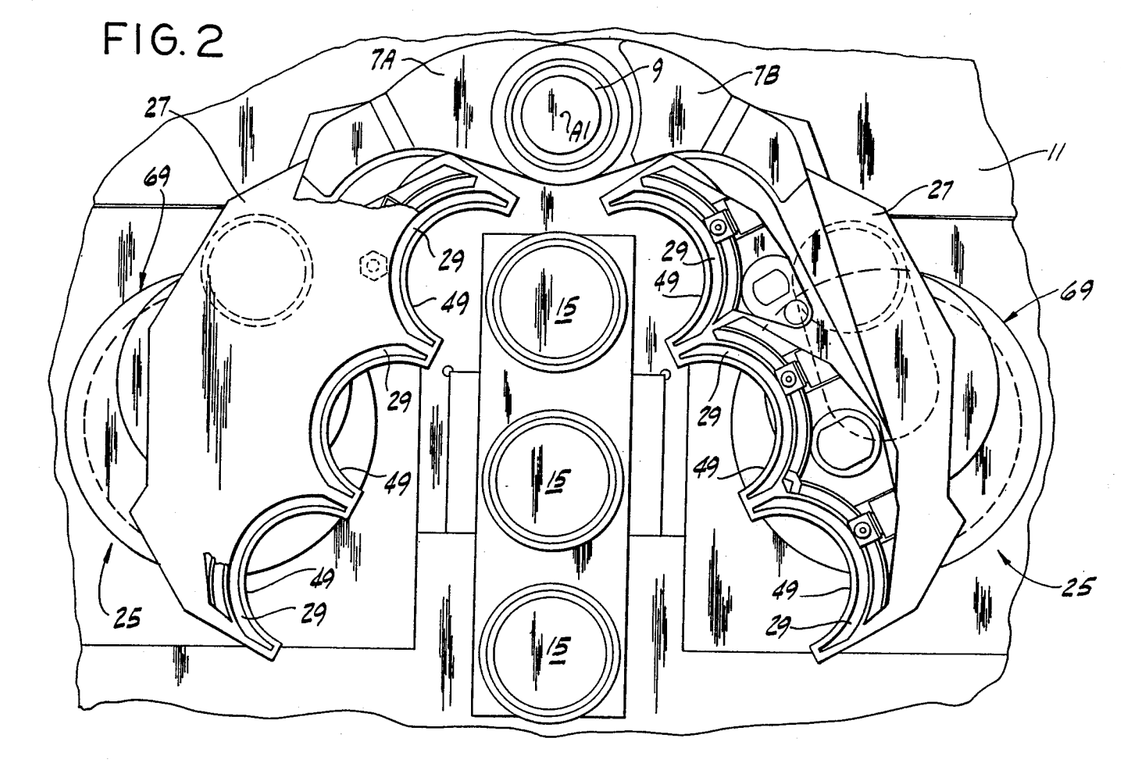
FIG. 2 is a view similar to FIG. 1 with the mold members removed showing the mold carriers in open position.
Figure 3:
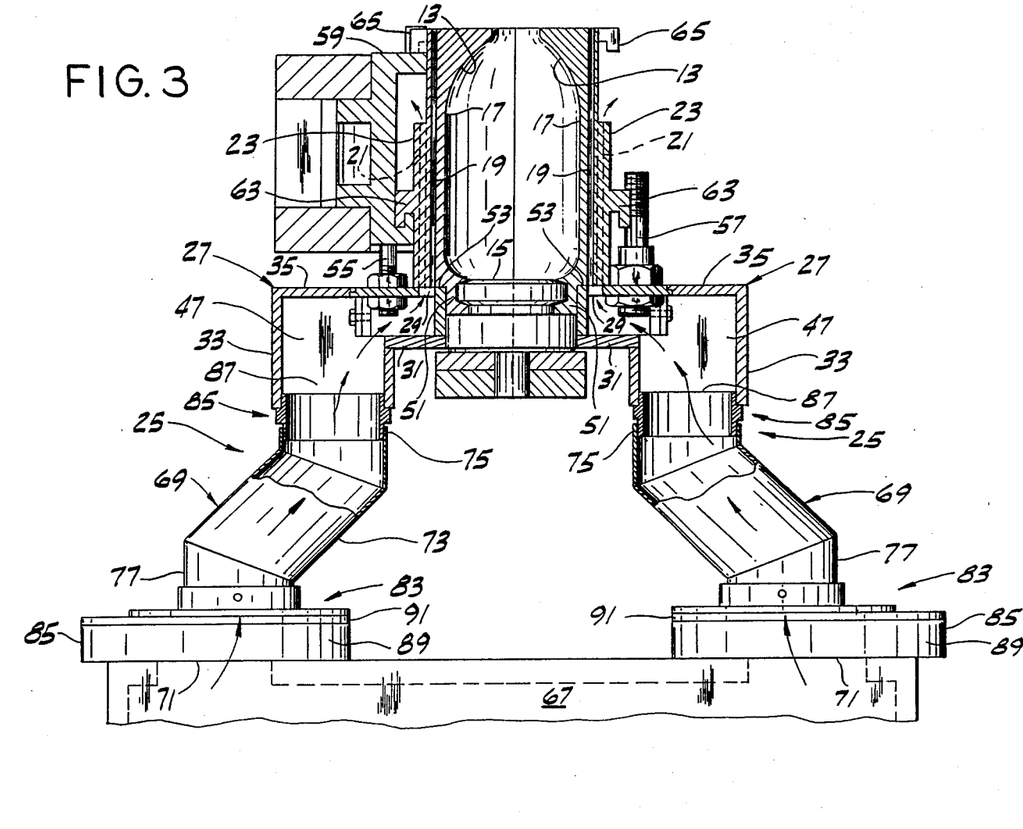
FIG. 3 is an enlarged vertical section generally on line 3—3 of FIG. 1.

Referring to FIGS. 1-5 of the drawings, the invention is illustrated as it is embodied on what is called the "mold side" of an individual section of a cyclically operating glassware forming machine of the individual section type, such as referred to in the above-noted U.S. Pat. No. 4,561,875 and in said Bolin U.S. patent applications, for cooling the mold members in which a parison or blank, formed on the parison or blank molding side of the section, is blown to form the final product, e.g. a bottle. The invention may also be embodied in the blank molding side of a section for cooling the blank mold members on that side. As illustrated in FIG. 1, the stated section of the glassware forming machine is of the type referred to as a triple gob section, comprising three pairs 1, 3 and 5 of mold members for molding three bottles at a time, each member constituting a mold half. It will be understood that the invention is applicable to glassware forming machine sections other than a triple gob section, e.g. a two-gob section. The two members of the first pair are designated 1A and 1B, the two members of the second pair are designated 3A and 3B and the two members of the third pair are designated 5A and 5B. The three mold members 1A, 3A and 5A are carried by a carrier 7A and the three mold members 1B, 3B, 5B are carried by a carrier 7B, the carriers being pivoted on a first and fixed generally vertical axis indicated at A1 for swinging movement toward and away from each other between he closed position in which they are illustrated in FIG. 1, wherein mold members 1A and 1B, 3A and 3B, 5A and 5B are closed on each other for the blow molding of a blank into a bottle in each of the closed pairs of members, and the open position in which they are illustrated in FIG. 2, wherein the two mold members of each pair of mold members are spaced from each other for entry there between of blanks and for removal of completed bottles. The carriers 7A and 7B are pivoted on a vertical shaft 9 which extends up from the top of a base 11 of the stated individual section of the glassware forming machine, suitable mechanism well-known in the art being provided for cyclically swinging the carriers between their open and closed positions for the bottle molding process.

Each mold member 1A, 1B, 3A, 3B, 5A and 5B constitutes a mold half, having a cavity 13 therein which is shaped in accordance with the shape of a bottle to be formed so that, with the two mold halves brought together in closed position, the cavities of the two halves define the shape of the wall and part of the neck of the bottle. At the bottom, the two mold halves of each pair closes on a mold bottom member 15 as well known in the art. The bottom of the bottle is formed against the mold bottom member 15, and the bottle is supported on the latter when the mold halves open. Each mold half has a generally arcuate peripheral wall 17 having air passages such as indicated at 19 and 21 extending upwardly from the bottom thereof, each of these passages opening into the ambient atmosphere at its upper end for passage of air through the passages for cooling the mold half, the air exiting into the ambient atmosphere from the upper ends of the passages. Passages 19 constitute an inner group of passages extending from bottom to top of the mold half on part of an inner circle. Passages 21 constitute an outer group of passages in an enlarged-diameter lower part 23 of the mold half on part of an outer circle, these passages opening into the ambient atmosphere at the top of said lower part 23 (see FIG. 3).

Means designated 25 in its entirety is provided for blowing air through the air passages 19 and 21 in both the open and closed positions of the mold halves, comprising a plenum 27 carried by each of the carriers 7A and 7B. The mold halves 1A etc. carried on each carrier extend up from the plenum on that carrier, the plenum having ports 29 (see FIGS. 2 and 3) at the top thereof for flow of air up into the passages 19 and 21 in the mold halves on the plenum and thence up through and out of the passages. Each plenum has a relatively shallow inner section 31 and a relatively deep outer section 33 (FIGS. 3 and 4), these sections having a common flat top wall 35, this wall and other walls of the plenum defining a plenum chamber 47. At the inside, the plenum is of scalloped formation having three scallops each designated 49, one for each of the three respective mold halves carried on the plenum. Each mold half has a reduced-diameter lower end portion 51 which fits in a respective scallop as appears in FIG. 3. At the upper end of the reduced-diameter lower end portion, each mold half has an outwardly extending downwardly facing flat horizontal shoulder portion 53 which seats on the top wall of the respective plenum around the respective scallop. The passages 19 and 21 extend upwardly from this shoulder, and each of the ports 29 is constituted by an arcuate slot in the top wall 35 of the plenum adjacent the respective scallop. Each mold half is removably associated in suitable manner with the respective plenum with the lower ends of the passages 19 and 21 of the mold half in register with a respective slot 29. Extending up from the top wall 35 of each plenum are studs 55 and 57 by means of which the plenum is secured to parts 59 and 61 on the respective carrier arm 7A, 7B. Each mold half is associated with a respective part 59, 61 as indicated at 63 and 65 in FIG. 3.

As previously described, the shaft 9 on which the carriers or arms 7A, 7B are pivoted extends up from the base 11 of the stated section of the glassware forming machine, this base being formed to provide and thereby constituting means providing a chamber 67 for air to be blown into the plenums and thence up through the passages 19 and 21 in the mold halves 1A etc. both when they are in their closed position and when they are in their open position. The base with the chamber 67 therein is sometimes referred to as the "wind box" of the machine. The chamber is supplied with air by a blower (not shown) in a manner well known in the art. Means indicated generally at 69 is provided for delivery of air from the chamber 67 to each plenum 27, this means being such as to allow swinging of the carriers 7A, 7B, and comprising for each plenum (i.e. for each carrier 7A, 7B) an air outlet 71 at the top of the chamber 67 for delivery of air from the air chamber through said outlet. The delivery means further comprises a duct 73, having a downwardly extending inlet 79 at its lower end 77 and an upwardly extending outlet 81 at its upper end 75. The inlet 79 and the outlet 81 are preferably laterally offset.

The delivery means includes means, indicated generally as 83, for munting the inlet 79 of the duct 73 over the air outlet 71 of the chamber 67 for universal sliding movement of said inlet 79 of the duct 73 laterally with respect to the inlet 79 within an area in communication with the air outlet 71 and in generally sealed relationship therewith. The mounting means 83 also permits the duct 73 to pivot at its lower or inlet end about a generally vertical axis in the course of its universal sliding movement. Thus the inlet end can slide laterally in any direction, i.e. universally in the lateral plane, throughout an area bounding the air outlet in generally sealed relation therewith.

Figure 4:
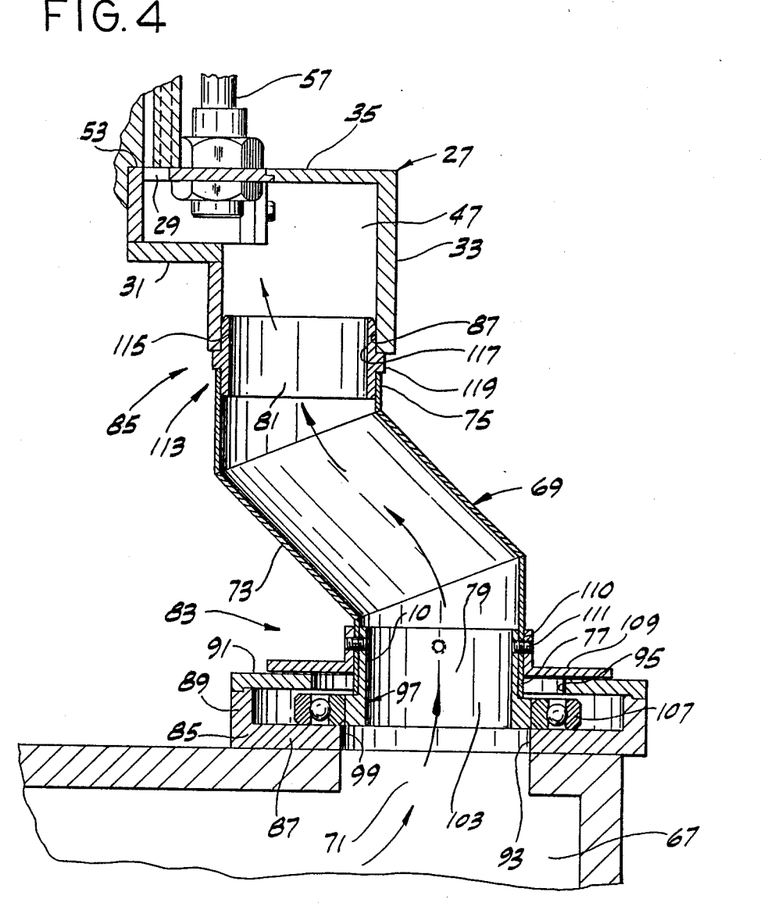
FIG. 4 is an enlarged vertical section similar to FIG. 3, showing one of the air conducting means.
Figure 5:
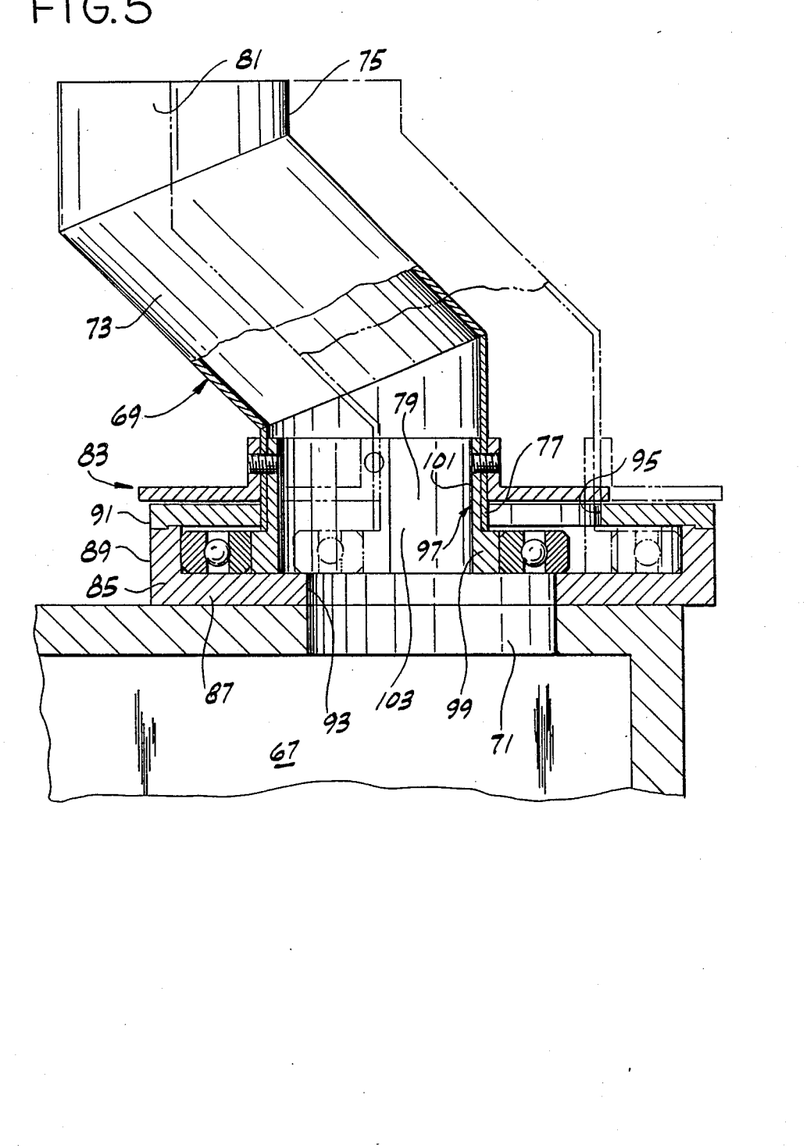
FIG. 5 is a further enlarged section of the lower portion in FIG. 4, showing the slide member and duct in their inward position corresponding to the arms being open, and showing (in phantom) the slide member and duct in their outward position, corresponding to the carrier arms being intermediate their open and closed positions.

As best shown in FIGS. 4 and 5, the means 83 for mounting the lower end 77 of the duct 73 over the air outlet 71 of the chamber 67 comprises a shallow box 85 having a bottom 87, sidewalls 89, and top 91. The bottom 87 of the box 85 has an opening 93 therein generally aligned with the air outlet 71 of chamber 67 for the passage of air. The box 85 is preferably generally circular, generally overlying and surrounding the air outlet 71. The top 91 of the box 85 also has an opening 95 therein; the opening 95 is preferably generally circular. A slide member 97 is slidably received in the box 85. The slide member 97 comprises a body 99 and an extension 101 projecting through the opening 95 in the top 91 of the box 85. The extension 101 is smaller than the opening 95 to allow the slide member 97 to slide within the box 85. The slide member 97 has a passage 103 therethrough. The passage 103 opens at one end at the bottom of the body 99, to communicate with the opening 93 in the bottom 87 of the box 85, and opens at the other end at he top of the extension 101. The lower or inlet end 77 of the duct 73 is connected to the extension 101 for the passage of air from the chamber 67 through the air outlet 71, through the opening 93 in the bottom of the box 85, through the passage 103 and into the duct 73.

The slide member 97 can freely slide within the box 85 in all directions, i.e., universally, over an area bounding the air outlet 71. The exact area over which the slide member 97 can slide is defined either by the dimensions of the box 85, or by the size of the opening 95 through which the extension 101 projects. Preferably the box 85 and slide member are sized so that the slide member 97 can engage the sidewall 89. As noted above, the sidewall may be circular or have some other smooth, continuous curved shape so that the slide member 97 can slide along the sidewall 89. The inner race of a ball bearing 107 may be mounted over the body 99 of the slide member 97. The ball bearing 107 allows the slide member to "roll" around the sidewall 89 of the box 85. The ball bearing 107 helps to prevent the slide member 97 from dragging so that the device operates smoothly. The ball bearing 107 also allows the slide member 97 to freely pivot, even when it has been pulled against the sidewall 89 of the box 85 by the operation of the glass making machine.

A generally annular sealing plate 109 is preferably mounted on the extension 101, and is sized to overlap the marginal edges of the opening 95 in the top 91 of the box 85, in all positions of the slide member, to retard the escape of air. As best shown in FIGS. 4 and 5, the sealing plate 109 has a cylindrical collar 110 which sandwiches the lower end 77 of the duct 73 against the extension 101, and which is secured to the extension 101 with set screws 111. The plate 109 may be positioned above or below the top 91, but is preferably above the top. The plate is spaced sufficiently from the top so that the slide member 97 can move freely, yet they are sufficiently close that the escape of air from between the plate and top is retarded.

The delivery means includes means, indicated generally as 113, for pivotally mounting the upper or outlet end 75 of the duct 73 with respect to an opening 115 in the bottom of the plenum 27. This pivotal mounting means 113 preferably comprises a generally tubula bushing 117, pivotally mounted in the upper end 75 of the duct 73 and in the opening 115 of the plenum 27. A radially projecting flange 119 on the bushing 117 separates the plenum and the duct.

Thus, the lower or inlet end 77 of the duct 73 slides ad pivots relative to the air outlet 71 of the chamber 67 with the inlet 79 of the duct 73 in communication with the chamber 47 for the passage of air, and the upper or outlet end 75 of the duct 73 pivots relative to the plenum 27 with the outlet 81 of the duct 73 in communication with the plenum 27 for the passage of air, so that the means 69 accommodates the pivoting of the carriers 7A and 7B, while continuously delivering air from the chamber 67 to the plenums 27.

OPERATION

In operation, the carriers 7A, 7B swing open and closed to form and release glassware, while the cooling system of the present invention continuously provides cooling air to the molds. When the carriers are in their closed position as shown in FIG. 1, air passes upwardly through the air outlet 71 of the chamber through the opening 93 in the bottom of the box 85, through the passage 103 in the slide member 97, through the duct 73, and into the plenum 27. As the carrier arms open to the position shown in FIG. 2, the duct 73 pivots, and the slide member 87 is first pushed outwardly and somewhat forwardly (as shown in phantom in FIG. 5), and as the carrier arms continue to open the slide member is pulled rearwardly and inwardly toward the back of the box 85. As the duct 73 pivots and slides, the lower end 77 at all times remains in communication with the chamber 67 and the upper end 75 at all times remains in communication with plenum 27. When the carrier arms 7A, 7B are fully open, the slide member 97 has been pulled generally to the back of the box 85, toward the center of the machine. The slide member freely slides universally within the box. Even when the motion of the carrier arms pulls the slide member 97 against the sidewall 97 of the box 85, the slide member freely slides and pivots because of the ball bearing 107.

As the carrier arms close, returning to the position shown in FIG. 1, the slide member pivots and slides generally inwardly and forwardly in the box 85. Again, the lower end 77 of the duct 73 at all times remains in communication with the chamber 67 and the upper end 75 of the duct 73 at all times remains in communication with plenum 27. Thus air is continuously provided to the molds even while the carrier arms are in motion. The cooling system provides broad freedom of movement for the duct 73, and its pecise motion is not controlled nor does it necessarily repeat from cycle to cycle. The duct is sufficiently free to move that it does not impair movement of the carrier arms either opening or closing.

In view of the above, it will be seen that the several objects of the invention are achieved and other advantageous results attained.

As various changes could be made in the above constructions without departig from the scope of the invention, it is intended that all matter contained in the above description or shown in the accompanying drawings shall be interpreted as illustrative and not in a limiting sense.

What is claimed is:

1. A glassware forming machine comprising:
    a pair of carriers each pivoted on a generally vertical axis for swinging movement toward and away from each other between an open position and a closed position;
    a plurality of mold members carried by each carrier, each mold member on each carrier being related to a mold member on the other so that, with the carriers in their said closed position, each mold member on one carrier mates with a mold member on the other to define a mold cavity for molding an item of glass;

each mold having air passages extending upwardly from the bottom thereof for passage of air therethrough for cooling;

and means for blowing air through said air passages comprising:

a plenum carried by each carrier for delivering air to the air passages of the mold members carried by the carrier, the mold members extending up from the plenum and the plenum having ports at the top thereof for flow of air up into the passages in the mold members and thence up through and out of said passages, and a bottom wall with an opening therein;

means providing a chamber below the carriers for air to be blown into the plenum and thence up through said air passages; and means of delivery of air from the chamber to each plenum allowing swinging of said carrier, comprising:

means defining an air outlet at the top of the chamber for delivery of air from said chamber through said outlet;

a duct having a downwardly extending inlet at one end and an upwardly extending outlet at the other end;

means mounting the inlet end of the duct over the air outlet of the chamber for universal sliding movement of said inlet end of the duct laterally with respect to said inlet of the duct within in area in communication with the air outlet and in generally sealed relation therewith, said mounting means also permitting the duct to pivot at its inlet end about a generally vertical axis in the course of its universal sliding movement; and means for pivotally mounting the outlet end of the duct with respect to the opening in the bottom of the plenum, the inlet end of the duct sliding and pivoting relative to the air outlet of the chamber with the inlet of the duct in communication with the chamber for the passage of air, and the outlet end of the duct pivoting relative to the manifold with the outlet of the duct in communication with the manifold for the passage of air, to accommodate the pivoting of the carriers while continuously delivering air from the chamber to the plenum.

2. The glassware forming machine according to claim 1 wherein the means for mounting the inlet end of the duct allows the inlet end of the duct to side over a generally circular area bounding the outlet of the chamber.

3. The glssware forming machine according to claim 1 wherein the means for mounting the inlet end of the duct over the air outlet of the chamber comprises:

a shallow box having a bottom, sidewalls, and a top, the bottom of the box having an opening therein in communication with the air outlet of the chamber for the passage of air from the chamber, the top of the box also having an opening therein;

a slide member having a body received in the box and an extension projecting through the opening in the top of the box, the extension being smaller than the opening to allow the slide member to slide in the box, the slide member having a passage therethrough opening at one end at the bottom of the body, to communicate with the opening in the bottom of the box, and opening at the other end at the top of the extension; and means for connecting the inlet end of the duct to the extension for the passage of air from the chamber, through the slide member and into the duct.

4. The glassware forming machine according to claim 3 further comprising a sealing plate on the extension for overlapping the marginal edges of the opening in the top of the box, to retard the escape of air from between the extension and the sides of the opening in the top of the box.

5. The glassware forming machine according to claim 4 wherein the sealing plate overlaps the top surface of the top of the box.

6. The glassware forming machine according to claim 3 wherein the slide member comprises a ball bearing, the inner race of which is mounted over the body.

7. The glassware forming machine according to claim 3 wherein the box defines a circular area bounding the outlet within which the slide member can slide.

8. The glassware forming machine according to claim 7 wherein the slide member includes a ball bearing, the inner race of which is mounted on the body so that when the outer race engages the sidewalls of the box, the body can freely rotate.

9. A glassware forming machine comprising:

a pair of carrers each pivoted on a generally vertical axis for swinging movement toward and away from each other between an open position and a closed position;

a plurality of mold members carried by each carrier, each mold member on each carrie being related to a mold member on the other so that, with the carriers in their said closed position, each mold member on one carrier mates with a mold member on the other to define a mold cavity for molding an item of glass;

each mold having air passages extending upwardly from the bottom thereof for passage of air therethrough for cooling;

and means for blowing air through said air passages comprising:

a plenum carried by each carrier for delivering air to the air passages of the mold members carried by the carrier, the mold members extending up from the plenum and the plenum having ports at the top thereof for flow of air up into the passages in the mold members and thence up through and out of said passages, and a bottom wall with an opening therein;

means providing a chamber below the carriers for air to be blown into the plenum and thence up through said air passages; and means for delivery of air from said chamber means to each plenum allowing swinging of said carrier, comprising:

means defining an air outlet at the top of the chamber for delivery of air from said chamber through said outlet;

an air duct having a downwardly extending inlet at one end and an upwardly extending outlet at its other end;

means for mounting the inlet end of the air duct over the air outlet of the chamber for universal sliding movement of said inlet end of the air duct laterally with respect to said inlet end of the duct within an area in communication with the air outlet and in generally sealed relation therewith, said mounting means also permitting the air duct to pivot at its inlet end about a generally vertical axis in the course of its universal sliding movement, said mounting means including a shallow box having a bottom with an opening therein in communication with the air outlet of the chamber or the passage of air from the chamber, a sidewall, and a top also having an opening therein; and a slide member received in the box and having an extension, connected to the inlet end of the duct, projecting through the opening in the top of the box, the extension being sufficiently smaller than the opening in the top of the box to permit the slide member to slide in the box, the slide member having a passage therethrough opening at one end in the bottom of the slide member to communicate with the opening in the bottom of the box and at the other end at the top of the extension to communicate with the air duct, means for pivotally mounting the outlet end of the air duct in the opening in the bottom of the plenum;

the inlet end of the air duct sliding and pivoting relative to the outlet of the chamber, with the inlet of the air duct in communication with the chamber for the passage of air, and the outlet end of the air duct pivoting relative to the manifold, with the outlet of the duct in communication with the plenum for the passage of air, to accommodate the pivoting of the carriers while continuously delivering air from the chamber means to the plenum.

10. The glassware forming machine according to claim 9 further comprising a sealing plate on the extension for overlapping the marginal edges of the opening in the top of the box, to retard the escape of air from between the extension and the sides of the opening in the top of the box.

11. The glassware forming machine according to claim 10 wherein the sealing plate overlaps the top surface of the top of the box.

12. The glassware forming machine according to claim 9 further comprising a ball bearing, the inner race of which is mounted on the portion of the slide member received in the box.

13. The glassware forming machine according to claim 9 wherein the box defines a circular area bounding the outlet within which the slide member can slide.

14. The glassware forming machine according to claim 13 wherein the slide member includes a ball bearing, the inner race of which is mounted on the portion of the slide member received in the box so that when the outer race engages the sidewalls of the box, the slide member can freely rotate in the box.

15. A glassware forming machine comprising:

a pair of carriers each pivoted on a generally vertical axis for swinging movement toward and away from each other between an open position and a closed position;

a plurality of mold members carried by each carrier, each mold member on each carrier being related to a mold member on the other so that, with the carriers in their said closed position, each mold member on one carrier mates with a mold member on the other to define a mold cavity for molding an item of glass;

each mold having air passages extending upwardly from the bottom thereof for passage of air therethrough for cooling;

and means for blowing air through said air passages comprising:

a plenum carried by each carrier for delivering air to the air passages of the mold members carried by the carrier, the mold members extending up from the plenum and the plenum having ports at the top thereof for flow of air up into the passages in the mold members and thence up through and out of said passages, and a bottom wall with an opening therein;

means providing a chamber below the carriers for air to be blown into the plenum and thence up though said air passages; and means for delivery of air from said chamber means to each plenum allowing swinging of said carrier, comprising:

means defining an air outlet at the top of the chamber for delivery of air from the chamber through the outlet;

an air duct having a downwardly extending inlet at one end and an upwardly extending outlet at the other end;

means for mounting the inlet end of the air duct over the air outlet of the chamber for universal sliding movement of said inlet end of the air duct laterally with respect to said inlet end of the air duct within an area in communication with the air outlet and in generally sealed relation therewith, said mounting means permitting the air duct to pivot at its inlet end about a generally vertical axis in the course of its universal, the mounting means including a shallow box on the chamber having a bottom with an opening in communication with the air outlet of the chamber, sidewalls, and a top also with an opening therein; and a slide member on the inlet end of the duct, slidably mounted in the box and having an extension connected to the inlet of the air duct that extends through the opening in the top of the box, the slide member having a passage therethrough opening at one end at the bottom of the slide member in communication with the opening in the bottom of the box and opening at the other end at the top of the extension to conduct air to the air duct; and a sealing plate on the extension for slidingly overlapping the marginal edges of the opening in the top of the box to retard the escape of air from between the extension and the edges of the opening in the top of the box;

means for pivotally mounting the outlet end of the air duct in the opening in the bottom of the plenum, the inlet end of the air duct sliding and pivoting relative to the outlet of the chamber, with the inlet of the air duct in communication with the chamber for the passage of air, and the outlet end of the air duct pivoting relative to the manifold, with the outlet of the air duct in communication with the manifold for the passage of air, to accommodate the pivoting of the carriers while continuously delivering air from the chamber means to the plenum.

16. The glassware forming machine according to claim 15 wherein the sealing plate overlaps the top surface of the top of the box.

17. The glassware forming machine according to claim 15 wherein the box defines a circular area bounding the outlet within which the slide member can slide.

18. The glassware forming machine according to claim 17 wherein the slide member including a ball bearing, the inner race of which is mounted on the portion of the slide member received in the box so that when the outer race engages the sidewalls of the box, the slide member can freely rotate in the box.

* * * * *

UNITED STATES PATENT AND TRADEMARK OFFICE
CERTIFICATE OF CORRECTION

PATENT NO. : 4,909,823

DATED : March 20, 1990

INVENTOR(S) : James A. Bolin

It is certified that error appears in the above-identified patent and that said Letters Patent is hereby corrected as shown below:

Column 1, line 49, "each carrie", should read ---each carrier---.

Column 5, line 13, "at he top", should read ---at the top---.

Column 5, line 57, "tubula", should read ---tubular---.

Column 5, line 62, "slides ad", should read ---slides and---.

Column 7, line 17, "means of", should read ---means for---.

Column 7, line 49, "side over", should read ---slide over---.

Column 7, line 52, "glssware", should read ---glassware---.

Column 8, line 25, "carrers", should read ---carriers---.

Column 8, line 30, "carrie", should read ---carriers---.

UNITED STATES PATENT AND TRADEMARK OFFICE
CERTIFICATE OF CORRECTION

PATENT NO. : 4,909,823

DATED : March 20, 1990

INVENTOR(S) : James A. Bolin

It is certified that error appears in the above-identified patent and that said Letters Patent is hereby corrected as shown below:

Column 9, line 4-5, "chamber or the", should read --chamber for the---.

Signed and Sealed this

Ninth Day of July, 1991

Attest:

HARRY F. MANBECK, JR.

Attesting Officer

Commissioner of Patents and Trademarks